United States Patent [19]
Descoins et al.

[11] 3,875,243
[45] Apr. 1, 1975

[54] 1-CYCLOPROPYL-TRANS-2-BUTEN-1-OL

[75] Inventors: Charles E. Descoins; Clive A. Henrick, both of Palo Alto, Calif.

[73] Assignee: Zoecon Corporation, Palo Alto, Calif.

[22] Filed: June 22, 1973

[21] Appl. No.: 372,709

Related U.S. Application Data

[62] Division of Ser. No. 218,512, Jan. 17, 1972, Pat. No. 3,825,607.

[52] U.S. Cl............................................. 260/617 R
[51] Int. Cl............................................ C07c 35/00
[58] Field of Search .................................. 260/617 R

[56] References Cited
FOREIGN PATENTS OR APPLICATIONS
884,640   12/1961   United Kingdom ............ 260/617 R

OTHER PUBLICATIONS

Beilsteins Handbuch der Organischen Chemie, Band 6, Ergan III, p. 217.

Cram et al., "Organic Chem.," p. 107 (1964).

*Primary Examiner*—Donald G. Daus
*Assistant Examiner*—David B. Springer
*Attorney, Agent, or Firm*—Lee-Louise H. Priest; Donald W. Erickson

[57] ABSTRACT

1-Cyclopropyl-trans-2-buten-1-ol is useful in the preparation of 8,10-dodecadienol.

1 Claim, No Drawings

1-CYCLOPROPYL-TRANS-2-BUTEN-1-OL

CROSS REFERENCE

This is a division of U.S. Ser. No. 218,512, filed Jan. 17, 1972, now U.S. Pat. No. 3,825,607, issued July 23, 1974.

INCORPORATION BY REFERENCE

Reference is hereby made to U.S. Pat. No. 3,825,607. All description therein is incorporated herein by reference.

SUMMARY OF INVENTION 8,10-Dodecadien-1-ol is prepared in the trans-trans form by a process which employs as essential steps in the coupling of a novel intermediate 1-halo-3,5-heptadiene in the trans-trans form with a protected 5-halo-1-pentanol in which one of the compounds is employed in the form of a Grignard reagent, followed by the hydrolysis of the protected group in the coupling product. The 1-halo-3,5-heptadiene is prepared by the action of aqueous hydrohalic acid on 1-cyclopropyl-2-butene-1-ol which may be prepared by a Grignard reaction between crotonaldehyde and cyclopropyl magnesium halide or between cyclopropyl cyanide and 1-propyl magnesium halide. 8,10-Dodecadienol is useful in entomological applications.

EXAMPLE 1

1-Cyclopropyl-trans-2-Buten-1-Ol

A solution of 25 g. (0.2 mole) of cyclopropyl bromide in 50 ml. of dry tetrahydrofuran was added dropwise under gentle reflux conditions to a reaction mixture initiated by mixing together 4.86 g. (0.2 mole) of magnesium turnings, 20 ml. of dry tetrahydrofuran, a crystal of iodine and 1 g. (0.01 mole) of cyclopropyl bromide. Thereafter, the reaction mixture was heated under reflux for 2 hours to complete the reaction with the formation of cyclopropyl magnesium bromide.

10.8 grams (0.18 mole) of freshly distilled crotonaldehyde in 50 ml. of tethydrofuran was added dropwise over a period of about 30 minutes to a cooled (to −20°C) solution of the above prepared cyclopropyl magnesium bromide in 50 ml. of dry tetrahydrofuran. The mixture was allowed to warm to 0°C and kept at this temperature for 2 hours to complete the reaction with the formation of the Grignard addition product of crotonaldehyde and cyclopropyl magnesium bromide.

500 milliliters of cold saturated ammonium chloride solution was added to the Grignard addition product mixture to hydrolyze the addition product. The resulting mixture was then extracted with three 100-milliliter portions of ethyl ether and the ether solution was washed twice with 100-milliliter portions of brine and then dried over magnesium sulfate. The solvent was then vaporized off and the yellow oily residue distilled under vacuum to obtain 10 grams (50% of theory) of the desired 1-cyclopropyl-2-buten-1-ol product, b.p. 68°–70°C at 0.8 mm. of Hg pressure. At 2 mm. of Hg pressure, 1-cyclopropyl-2-buten-1-boiled at 75°–76°C. The 1-cyclopropyl-2-buten-1-ol product had an infra red absorbance band at 965 cm-1 indicating a transethylenic double bond and the product to be 1-cyclopropyl-trans-2-butan-1-ol.

EXAMPLE 2

1-Cyclopropyl-Trans-2-Buten-1-Ol

Over a 3 hour period, dry propyne was bubbled into a mixture of 210 ml. (0.62 mole) of a 3M ethyl magnesium chloride solution and 400 ml. of dry tetrahydrofuran cooled to −5°C to obtain a 1-propynyl magnesium chloride Grignard reagent and ethane by-product. The reaction mixture was heated at gentile reflux to drive off the ethane and then cooled to room temperature.

A solution of 25 g. (0.4 mole) of cyclopropyl cyanide in 100 ml. of dry tetrahydrofuran was added dropwise to the above prepared Grignard reagent. The resulting mixture was heated at reflux temperature for 10 hours to obtain a Grignard addition compound of 1-propynyl magnesium chloride and cyclopropyl cyanide.

The reaction mixture was cooled, then 1000 ml. of cold, saturated ammonium chloride solution was added thereto to hydrolyte the addition compound, and the resulting solution was extracted with 500-, 250- and 250-milliliter portions of ether. The organic phases were combined and concentrated to 200 ml. under reduced pressure. The resulting brown solution was stirred together with 300 ml. of aqueous 10 percent sulfuric acid for 2 hours at about 50°C whereupon the organic phase became yellow in color. The mixture was cooled, the aqueous phase decanted and extracted with two 100-milliliter portions of other. The combined organic solutions were washed successively with two 100-milliliter portions of each of water, saturated sodium bicarbonate solution and brine, and then dried over magnesium sulfate. The solvent was removed by vaporization and the resulting orange residue was distilled to obtain a 1-cyclopropyl-2-butyn-1-one intermediate, b.p. 75°C at 0.2 mm. of Hg pressure.

A solution of 10.8 g. (0.1 mole) of the 1-cyclopropyl-2-butyn-1-ol intermediate in 40 ml. of dry tetrahydrofuran was added dropwise to a cooled solution of 40 ml. (0.1 mole) of a commercial 10.35 percent lithium aluminum hydride solution. After completion of the addition, the reaction mixture was heated overnight at gently reflux to complete the reaction with the formation of an aluminate reduction product complex. The mixture was then cooled, diluted with 50 ml. of ether, and the ether solution inimately contacted with 30 ml. of a concentrated ammonium chloride solution to hydrolyze the complex. The organic phase was decanted off and the mineral residue washed twice with ether. The combined ether solution was dried over magnesium sulfate, the ether then vaporize off, and the residue distilled to obtain 10 grams (90% of theory) of the desired 1-cyclopropyl-2-buten-1-ol product of b.p. 75°–76°C at 3 mm. of Hg pressure. The alcohol was determined to have a purity of 96 percent as determined by GLC. The spectroscopic date corresponding to the product obtained in Example 1 and thus to be 1-cyclopropyl-trans-2-buten-1-ol.

What is claimed is:

1. 1-Cyclopropyl-trans-2-buten-1-ol.

* * * * *